July 29, 1958  W. L. WOELK  2,844,915
PLANT PROTECTOR
Filed April 11, 1955
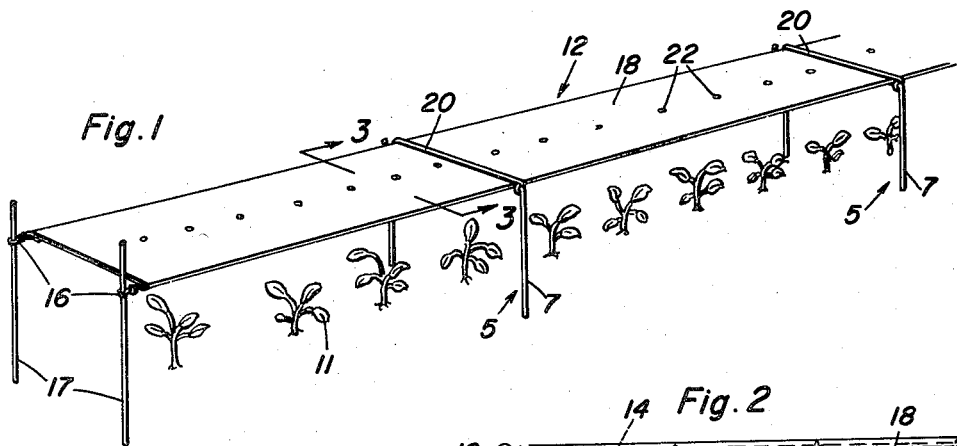
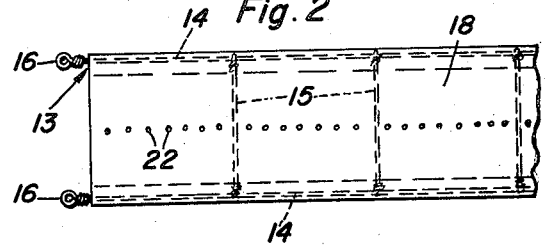
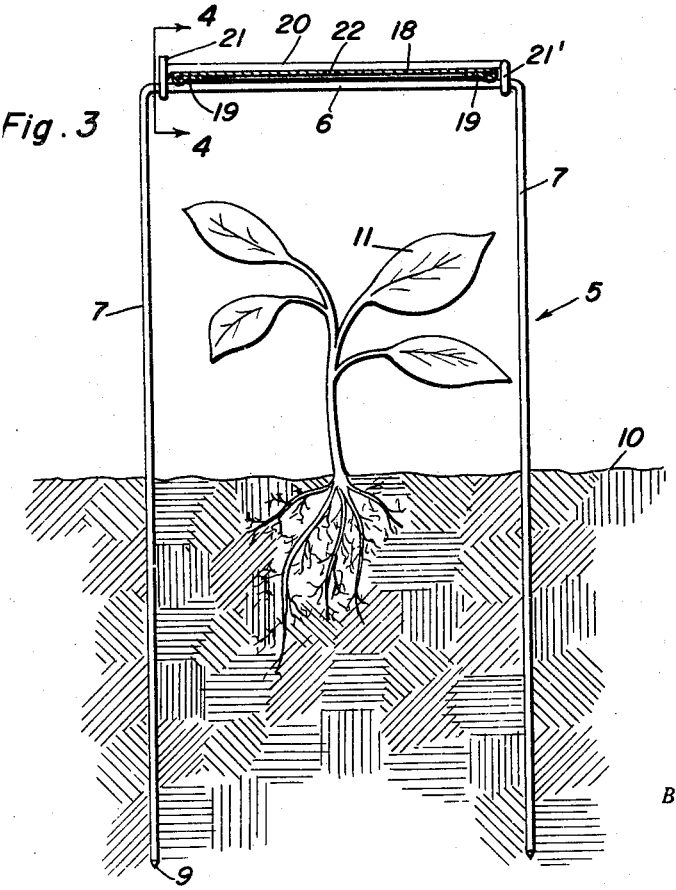
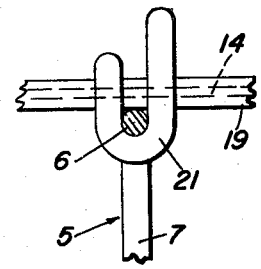
William L. Woelk
INVENTOR.

United States Patent Office 2,844,915
Patented July 29, 1958

2,844,915

PLANT PROTECTOR

William L. Woelk, Salem, Oreg., assignor of fifty percent to Eugene E. Laird, Salem, Oreg.

Application April 11, 1955, Serial No. 500,561

1 Claim. (Cl. 47—28)

The present invention relates to new and useful improvements in plant protectors, particularly for row crops such, for instance, as strawberries, and has for its primary object to provide, in a manner as hereinafter set forth, novel means for preventing such crops from being damaged by frost or freezing while interfering in no way with the natural growth and development of the plants.

Other objects of the invention are to provide a plant protector of the aforementioned character which will be comparatively simple in construction, strong, durable, highly efficient and reliable in use and which may be manufactured and installed at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view, showing a plant protector constructed in accordance with the present invention in use;

Figure 2 is a top plan view of an end portion of the device;

Figure 3 is a view in transverse section, taken substantially on the line 3—3 of Figure 1; and Figure 4 is a detail view in section, taken substantially on the line 4—4 of Figure 3.

Referring now to the drawing in detail, it will be seen that the embodiment of the invention which has been illustrated comprises a plurality of substantially U-shaped supports 5 of suitable metal. The supports 5 are formed from metallic rods and comprise bight portions 6 and legs 7. The legs 7 terminate at their free ends in points 9 to facilitate driving said legs downwardly into the ground, as at 10. The supports 5 are spaced from each other astraddle the row crop to be protected, as at 11.

Removably mounted on the supports 5 is a top 12. The top 12 includes an elongated frame 13 of suitable wire comprising longitudinal members 14 having crossmembers 15 welded thereto at spaced points. The members 14 of the frame 13 terminate in loops 16 adapted to be slipped over anchoring posts 17 erected at the ends of the protector.

The top 12 still further includes a covering 18 of perforated waterproof paper or other suitable material mounted on the wire frame 13. Toward this end, the longitudinal marginal portions of the covering 18 are folded and adhesively secured in a manner to provide hems 19 through which the longitudinal members 14 of the frame 13 pass.

Transverse metallic rods 20 secure the top 12 in position on the supports 5. At one end, the rods 20 are pivotally connected to the bight portions 6 of the supports 5 by loops 21'. As illustrated to advantage in Figure 4 of the drawing, the rods 20 terminate at their free ends in depending hooks 21 which are engageable under the bight portions 6 of the supports 5 for securing the top 12 in position thereon.

It is thought that the manner in which the protector functions will be readily apparent from a consideration of the foregoing. To install the protector, the supports 5 are erected at spaced points along the row, and the top 12 is mounted thereon. The anchoring posts 17 are erected and the loops 16 are engaged therewith for stretching or tensioning the top 12. The hold-down rods 20 are then applied for firmly securing the top 12 in position on the supports 5. Of course, the top 12 protects the plants 11 beneath the covering 18 in an obvious manner. The perforations 22 in the covering 18 are for the passage of moisture.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A plant protector of the character described comprising: pairs of anchoring posts, and a top adapted to be stretched between said posts, said top including a wire frame comprising longitudinal side members including end loops slidably and removably engaged with the posts over the upper ends thereof and further including crossmembers extending between said longitudinal members at spaced points, said top still further including a perforated flexible sheet covering mounted on the frame, said covering comprising hems on its longitudinal marginal portions enclosing the longitudinal members of said frame, and means for supporting the top at spaced points between the pairs of posts, the last named means comprising a plurality of substantially U-shaped supports including horizontal bight portions engaged beneath the top, and hold-down rods pivotally mounted on the bight portions of the supports for traversing the top and including end hooks on one end engaged with said bight portions of the supports, said rods paralleling said bight portions when in operative position.

References Cited in the file of this patent

UNITED STATES PATENTS

| | | |
|---|---|---|
| 77,775 | Snook | May 12, 1868 |
| 558,346 | Boyd | Apr. 14, 1896 |
| 617,034 | Merriman | Jan. 3, 1899 |
| 836,328 | Maxfield | Nov. 20, 1906 |
| 1,106,624 | Cadwallader et al. | Aug. 11, 1914 |
| 1,692,229 | Smith | Nov. 20, 1928 |
| 1,916,868 | Starks | July 4, 1933 |
| 2,028,220 | Kelly | Jan. 21, 1936 |
| 2,156,986 | Heuer | May 2, 1939 |
| 2,713,750 | Casas | July 26, 1955 |